United States Patent
Honda

(10) Patent No.: US 9,201,231 B2
(45) Date of Patent: Dec. 1, 2015

(54) SCANNING MICROSCOPE APPARATUS COMPRISING A SWITCHING PORTION AND AN OPTICAL AXIS ADJUSTMENT MECHANISM

(71) Applicant: OLYMPUS CORPORATION, Shibuya-ku, Tokyo (JP)

(72) Inventor: Susumu Honda, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 302 days.

(21) Appl. No.: 13/868,885

(22) Filed: Apr. 23, 2013

(65) Prior Publication Data

US 2013/0301121 A1    Nov. 14, 2013

(30) Foreign Application Priority Data

May 11, 2012    (JP) .................................. 2012-109539

(51) Int. Cl.
G02B 21/06    (2006.01)
G02B 21/00    (2006.01)
(Continued)

(52) U.S. Cl.
CPC ............ *G02B 21/06* (2013.01); *G02B 21/0032* (2013.01); *G02B 21/0076* (2013.01); *G02B 21/0088* (2013.01); *G02B 21/24* (2013.01); *G02B 26/008* (2013.01); *G02B 21/002* (2013.01); *G02B 21/0024* (2013.01)

(58) Field of Classification Search
CPC .... G02B 21/06; G02B 21/16; G02B 21/0032; G02B 21/002; G02B 21/0072; G02B 21/0076; G02B 21/361; G02B 21/362; G02B 21/0024
USPC .................................................. 359/388–398
See application file for complete search history.

(56) References Cited

U.S. PATENT DOCUMENTS 6,693,272 B2 *  2/2004  Adachi et al. .................. 250/216
7,180,661 B2 *  2/2007  Sasaki ........................... 359/385
(Continued)

FOREIGN PATENT DOCUMENTS

JP    11-052252 A    2/1999
JP    2003029153 A *  1/2003 ............. G02B 21/00

OTHER PUBLICATIONS

English Machine Translation of JP 2003029153 A.*

*Primary Examiner* — Thomas K Pham
*Assistant Examiner* — Nicholas R Pasko
(74) *Attorney, Agent, or Firm* — Holtz, Holtz, Goodman & Chick PC

(57) ABSTRACT

A microscope for observing a specimen, while switching optical-path splitting portions, by using bright images without a positional displacement between the images, includes an optical-axis moving portion that parallelly moves laser light; a scanning portion; an objective lens; a detector; a plurality of excitation dichroic mirrors placed in an optical path in an insertable/removable manner and split the optical path; an excitation DM turret that selectively switches the excitation dichroic mirrors; a storage portion storing entry-angle displacement information and transmitting-position displacement information for the laser light at the pupil position of the objective lens, which are associated with the individual excitation dichroic mirrors; and a control portion controlling the scanning portion based on the entry-angle displacement information associated with an excitation dichroic mirror placed in the optical path and also controlling the optical-axis moving portion 15 based on the transmitting-position displacement information associated with that dichroic mirror.

6 Claims, 12 Drawing Sheets

(51) Int. Cl.
*G02B 21/24* (2006.01)
*G02B 26/00* (2006.01)

(56) References Cited

U.S. PATENT DOCUMENTS

| | | | |
|---|---|---|---|
| 7,223,986 B2* | 5/2007 | Natori | 250/458.1 |
| 7,369,308 B2* | 5/2008 | Tsuruta et al. | 359/388 |
| 7,733,565 B2* | 6/2010 | Hattori et al. | 359/385 |
| 7,838,818 B2* | 11/2010 | Kanegae et al. | 250/235 |
| 7,864,414 B2* | 1/2011 | Sase et al. | 359/369 |
| 7,936,503 B2* | 5/2011 | Koike et al. | 359/388 |
| 8,040,597 B2* | 10/2011 | Sasaki | 359/388 |
| 8,873,123 B2* | 10/2014 | Murayama | 359/202.1 |
| 8,958,148 B2* | 2/2015 | Honda | 359/388 |
| 2011/0116165 A1* | 5/2011 | Suzuki | 359/388 |
| 2011/0141557 A1* | 6/2011 | Yoshida et al. | 359/385 |

* cited by examiner

FIG. 9

| | EXCITATION DM17A | EXCITATION DM17B | EXCITATION DM17C | EXCITATION DM17D | |
|---|---|---|---|---|---|
| SCANNING PORTION | A1 | B1 | C1 | D1 | T1 |
| OPTICAL-AXIS MOVING PORTION | A2 | B2 | C2 | D2 | T2 |
| SECOND SCANNING PORTION | A3 | B3 | C3 | D3 | T3 |
| OPTICAL-AXIS MOVING PORTION | A4 | B4 | C4 | D4 | T4 |

FIG. 11A

| | EXCITATION DM | CUBE DM | CORRECTION VALUE | |
|---|---|---|---|---|
| SCANNING PORTION | 17A | 217A | AA1 | |
| | | 217B | AB1 | |
| | | 217C | AC1 | |
| | | 217D | AD1 | |
| | 17B | 217A | BA1 | |
| | | 217B | BB1 | ~T5 |
| | | 217C | BC1 | |
| | | 217D | BD1 | |
| | 17C | 217A | CA1 | |
| | | 217B | CB1 | |
| | | 217C | CC1 | |
| | | 217D | CD1 | |
| | 17D | 217A | DA1 | |
| | | 217B | DB1 | |
| | | 217C | DC1 | |
| | | 217D | DD1 | |

FIG. 11B

| | EXCITATION DM | CUBE DM | CORRECTION VALUE | |
|---|---|---|---|---|
| OPTICAL -AXIS MOVING PORTION | 17A | 217A | AA2 | |
| | | 217B | AB2 | |
| | | 217C | AC2 | |
| | | 217D | AD2 | |
| | 17B | 217A | BA2 | |
| | | 217B | BB2 | ~T6 |
| | | 217C | BC2 | |
| | | 217D | BD2 | |
| | 17C | 217A | CA2 | |
| | | 217B | CB2 | |
| | | 217C | CC2 | |
| | | 217D | CD2 | |
| | 17D | 217A | DA2 | |
| | | 217B | DB2 | |
| | | 217C | DC2 | |
| | | 217D | DD2 | |

FIG. 11C

| | EXCITATION DM | CUBE DM | CORRECTION VALUE | |
|---|---|---|---|---|
| SECOND SCANNING PORTION | 17A | 217A | AA3 | |
| | | 217B | AB3 | |
| | | 217C | AC3 | |
| | | 217D | AD3 | |
| | 17B | 217A | BA3 | |
| | | 217B | BB3 | T7 |
| | | 217C | BC3 | |
| | | 217D | BD3 | |
| | 17C | 217A | CA3 | |
| | | 217B | CB3 | |
| | | 217C | CC3 | |
| | | 217D | CD3 | |
| | 17D | 217A | DA3 | |
| | | 217B | DB3 | |
| | | 217C | DC3 | |
| | | 217D | DD3 | |

FIG. 11D

| | EXCITATION DM | CUBE DM | CORRECTION VALUE | |
|---|---|---|---|---|
| OPTICAL-AXIS MOVING PORTION | 17A | 217A | AA4 | |
| | | 217B | AB4 | |
| | | 217C | AC4 | |
| | | 217D | AD4 | |
| | 17B | 217A | BA4 | |
| | | 217B | BB4 | |
| | | 217C | BC4 | T8 |
| | | 217D | BD4 | |
| | 17C | 217A | CA4 | |
| | | 217B | CB4 | |
| | | 217C | CC4 | |
| | | 217D | CD4 | |
| | 17D | 217A | DA4 | |
| | | 217B | DB4 | |
| | | 217C | DC4 | |
| | | 217D | DD4 | |

SCANNING MICROSCOPE APPARATUS COMPRISING A SWITCHING PORTION AND AN OPTICAL AXIS ADJUSTMENT MECHANISM

CROSS-REFERENCE TO RELATED APPLICATIONS

This application is based on Japanese Patent Application No. 2012-109539, the contents of which are incorporated herein by reference.

TECHNICAL FIELD

The present invention relates to a microscope apparatus.

BACKGROUND ART

In the related art, there is a known laser-scanning microscope apparatus provided with a plurality of dichroic mirrors that can be placed in an optical path in a switchable manner (for example, see Patent Literature 1). With the microscope apparatus disclosed in Patent Literature 1, information about image displacements that occur when acquiring images is stored in advance for the individual dichroic mirrors, and, when one of the dichroic mirrors is selected, an X-Y scanner is controlled by means of a computer based on the image displacement information corresponding to the selected dichroic mirror, thus correcting displacements in acquired images caused by the individual dichroic mirrors due to thicknesses and inclinations thereof when placed in the optical path.

CITATION LIST

Patent Literature

{PTL 1} Japanese Unexamined Patent Application, Publication No. Hei 11-52252

Non Patent Literature

SUMMARY OF INVENTION

Technical Problem

However, even if the X-Y scanner is controlled as in the microscope apparatus disclosed in Patent Literature 1, when optical-path splitting portions like the dichroic mirrors are switched, illumination light does not pass through the center of the pupil position of an objective lens but deviates from the center due to the machining precision and the mounting precision of the individual optical-path splitting portions, which reduces the brightnesses of images, making precise observation impossible.

The present invention provides a microscope apparatus with which a specimen can be observed, while switching optical-path splitting portions, by using bright images without a positional displacement between the images.

Solution to Problem

A first aspect of the present invention is a microscope apparatus including a shifting mechanism that can parallelly move illumination light emitted from a light source in a direction that intersects an optical axis; a scanning portion with which the illumination light is scanned on a specimen; an objective lens that radiates the illumination light scanned by the scanning portion onto the specimen and that collects return light returning from the specimen due to the irradiation with the illumination light; a detection portion that detects the return light collected by the objective lens; a plurality of optical-path splitting portions that are placed in an optical path of the illumination light and the return light in an insertable/removable manner and split the optical path; a switching portion that switches the optical-path splitting portion placed in the optical path; a first storage portion that stores entry-angle displacement information for the illumination light at a pupil position of the objective lens, which information is associated with the individual optical-path splitting portions; a first control portion that controls the scanning portion based on the entry-angle displacement information stored in the first storage portion in association with the optical-path splitting portion placed in the optical path by means of the switching portion; a second storage portion that stores transmitting-position displacement information for the illumination light at the pupil position of the objective lens, which information is associated with the individual optical-path splitting portions; and a second control portion that controls the shifting mechanism based on the transmitting-position displacement information stored in the second storage portion in association with the optical-path splitting portion placed in the optical path by means of the switching portion.

With this aspect, the illumination light emitted from the light source is scanned by the scanning portion and is radiated onto the specimen by means of the objective lens via one of the optical-path splitting portions placed in the optical path by means of the switching portion. Then, the return light returning from the specimen is collected by the objective lens and is detected by the detection portion via the same optical-path splitting portion, thus making it possible to acquire an image of the specimen and to perform observation thereof.

When the optical-path splitting portions are switched, a displacement occurs in the position at which the specimen is irradiated with the illumination light due to the machining precision and the mounting precision of the individual optical-path splitting portions, which sometimes causes a positional displacement between acquired images of the specimen and a reduction in the brightness of the images due to a displacement of the transmitting position at the pupil position of the objective lens.

In this case, when the optical-path splitting portion placed in the optical path is switched, the first control portion controls the scanning portion based on the entry-angle displacement information for the illumination light at the pupil position of the objective lens that is stored in the first storage portion in association with the optical-path splitting portion placed in the optical path, which makes it possible to match the entry angles of the illumination light at the objective lens, irrespective of the machining precision and the mounting precision of the individual optical-path splitting portions. Accordingly, with each optical-path splitting portion used, the illumination light can be radiated onto the same location in the specimen, and thus, a positional displacement between images can be corrected.

In addition, because the second control portion controls the shifting mechanism based on the transmitting-position displacement information for the illumination light at the pupil position of the objective lens stored in the second storage portion in association with the optical-path splitting portion placed in the optical path, the illumination light can be made to pass through the center of the pupil position of the objective lens, irrespective of the machining precision and the mounting precision of the individual optical-path splitting portions. By doing so, with each optical-path splitting portion used, the specimen can be irradiated without any loss of illumination light, and thus, the images can be corrected for a reduction in brightness thereof.

Therefore, the specimen can be observed, while switching the plurality of optical-path splitting portions, using bright images without a positional displacement between the images.

In the above-described aspect, the shifting mechanism may be disposed in the optical path between the light source and the scanning portion.

By employing such a configuration, the illumination light can be made to pass through the center of the pupil position of the objective lens in a highly precise manner by shifting the illumination light by means of the shifting mechanism before scanning with the scanning portion. In addition, because a displacement due to shifting of the illumination light is corrected before the scanning portion, that is, at a portion closer to the light source than the scanning portion, it is possible to prevent, for example, a laser beam serving as the illumination light from missing a mirror surface of a galvanometer scanner serving as the scanning portion.

In the above-described aspect, the optical-path splitting portions may split the optical path of the illumination light and the optical path of the return light.

By employing such a configuration, when the optical-path splitting portion placed in the optical path is switched by means of the switching portion in accordance with fluorescent dyes used in the specimen, it is possible to acquire desired bright fluorescence images of the specimen without a positional displacement between the images, irrespective of the machining precision and the mounting precision of the individual optical-path splitting portions.

In the above-described aspect, the optical-path splitting portions may split the optical path of the illumination light and the return light and an optical path of other illumination light emitted from an other light source and other return light returning from the specimen due to irradiation of the specimen with the other illumination light.

By employing such a configuration, when the other light source is used in combination in the observation of the specimen performed by using the optical-path splitting portions, it is possible to acquire bright images without a positional displacement between the images, irrespective of the machining precision and the mounting precision of the individual optical-path splitting portions.

The above-described aspect may be provided with a second scanning portion with which the illumination light can be scanned on the specimen at a scanning speed differing from a scanning speed of the scanning portion; and a switching mechanism that switches between scanning of the illumination light by means of the second scanning portion and scanning of the illumination light by means of the scanning portion, wherein the first storage portion may store, in association with the scanning portion, the entry-angle displacement information for the case in which the illumination light is scanned by means of the scanning portion, and it may also store, in association with the second scanning portion, entry-angle displacement information for the case in which the illumination light is scanned by means of the second scanning portion; in accordance with switching performed by the switching mechanism, when the illumination light is to be scanned by means of the scanning portion, the first control portion may control the scanning portion based on the entry-angle displacement information stored in association with the scanning portion, and, when the illumination light is to be scanned by means of the second scanning portion, the first control portion may control the second scanning portion based on the entry-angle displacement information stored in association with the second scanning portion; the second storage portion may store the transmitting-position displacement information for the case in which the illumination light is scanned by means of the scanning portion, and it may also store transmitting-position displacement information for the case in which the illumination light is scanned by means of the second scanning portion; and in accordance with switching performed by the switching mechanism, when the illumination light is to be scanned by means of the scanning portion, the second control portion may control the scanning portion based on the transmitting-position displacement information stored in association with the scanning portion, and, when the illumination light is to be scanned by means of the second scanning portion, the second control portion may control the second scanning portion based on the transmitting-position displacement information stored in association with the second scanning portion.

By employing such a configuration, it is possible to correct an entry-angle displacement of the illumination light at the objective lens that occurs when the second scanning portion is used due to the machining precision and the mounting precision of the individual optical-path splitting portions, and it is also possible to correct a transmitting-position displacement of the illumination light at the pupil position of the objective lens, which occurs when the scanning portion is switched to the second scanning portion by means of the switching mechanism. Therefore, it is possible to acquire desired bright fluorescence images of the specimen without a positional displacement between the images. Thus, it is not only possible to observe the specimen by using the scanning portion, but it is also possible to observe the specimen by quickly acquiring images by scanning the illumination light at a higher speed by using the second scanning portion.

Advantageous Effects of Invention

The present invention affords an advantage in that a specimen can be observed, while switching optical-path splitting portions, by using bright images without a positional displacement between the images.

BRIEF DESCRIPTION OF DRAWINGS

FIG. 9 is a diagram showing the table related to the correction values for the scanning portion, the table related to the correction values for the optical-axis moving portion, a table related to correction values for a second scanning portion, and a table related to correction values for a switching mechanism.

FIG. 11A is a diagram showing a table related to correction values for the scanning portion.

FIG. 11B is a diagram showing the other table related to correction values for the the scanning portion.

FIG. 11C is a diagram showing a table related to correction values for the second scanning portion.

FIG. 11D is a diagram showing the other table related to correction values for the second scanning portion.

DESCRIPTION OF EMBODIMENTS

First Embodiment

A microscope apparatus according to a first embodiment of the present invention will be described below with reference to the drawings.

Figure 1:
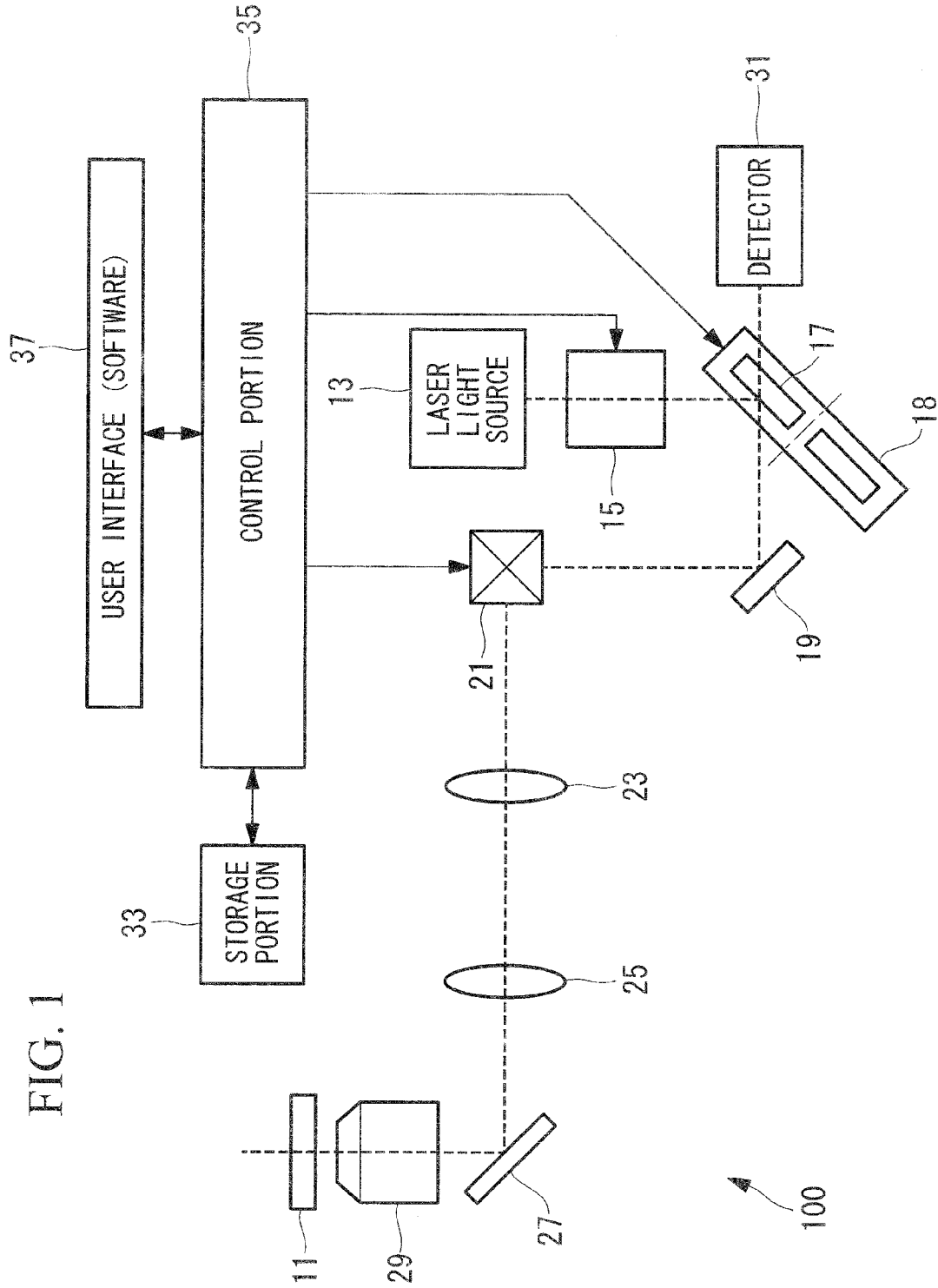
FIG. 1 is a configuration diagram showing, in outline, a microscope apparatus according to a first embodiment of the present invention.

As shown in FIG. 1, a microscope apparatus 100 according to this embodiment is provided with a stage 11 on which a specimen (not shown) is placed; a laser light source (light source) 13 that emits laser light (illumination light); a scanning portion 21 that reflects the laser light emitted from the laser light source 13 and scans it on the specimen; a pupil projection lens (PL) 23 that focuses the laser light reflected by the scanning portion 21; an imaging lens (TL) 25 that collimates the laser light focused by the pupil projection lens 23; an objective lens 29 that radiates the laser light collimated by the imaging lens 25 onto the specimen and collects fluorescence (return light) generated at the specimen; a plurality of switchable excitation dichroic mirrors (excitation DMs, optical-path splitting portions) 17 that split an optical path of the laser light and an optical path of the fluorescence; and a detector (detection portion) 31 that detects the fluorescence whose optical path is split from the optical path of the laser light by means of the excitation dichroic mirrors 17.

In FIG. 1, reference signs 19 and 27 both indicate reflection mirrors.

As the scanning portion 21, it is possible to employ, for example, a proximity galvanometer-mirror scanner (an X-Y galvanometer scanner that is provided with a pair of galvanometer mirrors (not shown), disposed close to each other, and in which a conjugate position of the pupil position of the objective lens 29 is positioned at the midpoint between the pair of galvanometer mirrors). The swivel angle about an axis that intersects the optical axis of the laser light can be controlled individually for each galvanometer mirror in the pair, and the laser light can be deflected by controlling changes in the swivel angles of the pair of galvanometer mirrors.

The plurality of excitation dichroic mirrors 17 differ from each other in terms of their characteristics of transmitted wavelengths and reflected wavelengths and are mounted to an excitation DM (dichroic mirror) turret (switching portion) 18.

The excitation DM turret 18 is disposed between the laser light source 13 and the scanning portion 21 so as to be rotatable about a rotating shaft (indicated by one-dot chain line in FIG. 1).

The plurality of excitation dichroic mirrors 17 are disposed around the rotating shaft of the excitation DM turret 18 with spaces therebetween in the circumferential direction. By rotating the excitation DM turret 18 about the rotating shaft, one of the excitation dichroic mirrors 17 can be placed in the optical path of the laser light and the fluorescence.

As the detector 31, it is possible to employ, for example, a PMT (Photomultiplier Tube). When fluorescence is detected by the detector 31, an image of the specimen is generated by an image generating portion (not shown) based on the intensity of that fluorescence.

The microscope apparatus 100 is also provided with an optical-axis moving portion (shifting mechanism) 15 that can parallelly move the laser light emitted from the laser light source 13 in a direction that intersects the optical axis thereof; a storage portion (including a first storage portion and a second storage portion) 33 that stores information about displacements of images of the specimen and information about brightnesses thereof, which are associated with the individual excitation dichroic mirrors 17; a control portion (including a first control portion and a second control portion) 35 that controls the excitation DM turret 18, the scanning portion 21, and the optical-axis moving portion 15; and a user interface portion (software) 37 that includes an input portion (not shown) for transmitting instructions from a user to the control portion 35 and a display portion (not shown) for communicating output results from the control portion 35 to the user.

Figure 2:
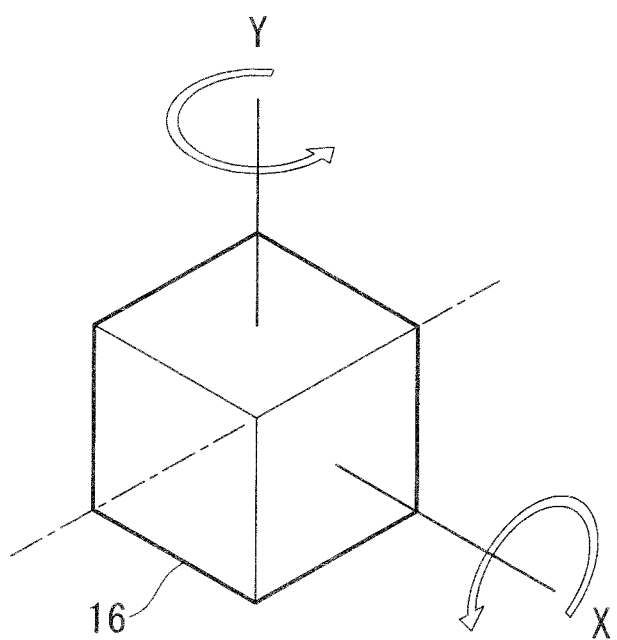
FIG. 2 is a perspective view showing a plane-parallel plate in an optical-axis moving portion in FIG. 1.

The optical-axis moving portion 15 is disposed in an optical path between the laser light source 13 and the excitation DM turret 18. In addition, as shown in FIG. 2, the optical-axis moving portion 15 is provided with a plane-parallel plate 16, like a prism, that allows the laser light to pass therethrough. In the optical-axis moving portion 15, the plane-parallel plate 16 can be rotated about two axes (X-axis and Y-axis) that are orthogonal to each other with respect to the optical axis of the laser light.

Also, the optical-axis moving portion 15 can change the angle at which the laser light enters the plane-parallel plate 16 by rotating the plane-parallel plate 16 about the X-axis or the Y-axis, so that the laser light can be moved parallelly, that is, shifted, in accordance with the entry angle.

The storage portion 33 stores the information about displacements of the images of the specimen in the form of information about displacements in the entry angles of the laser light at the pupil position of the objective lens 29, which is associated with the individual excitation dichroic mirrors 17, and also stores the information about the brightnesses of the images of the specimen in the form of information about displacements in transmitting positions of the laser light at the pupil position of the objective lens 29, which is also associated with the individual excitation dichroic mirrors 17.

Figure 3:
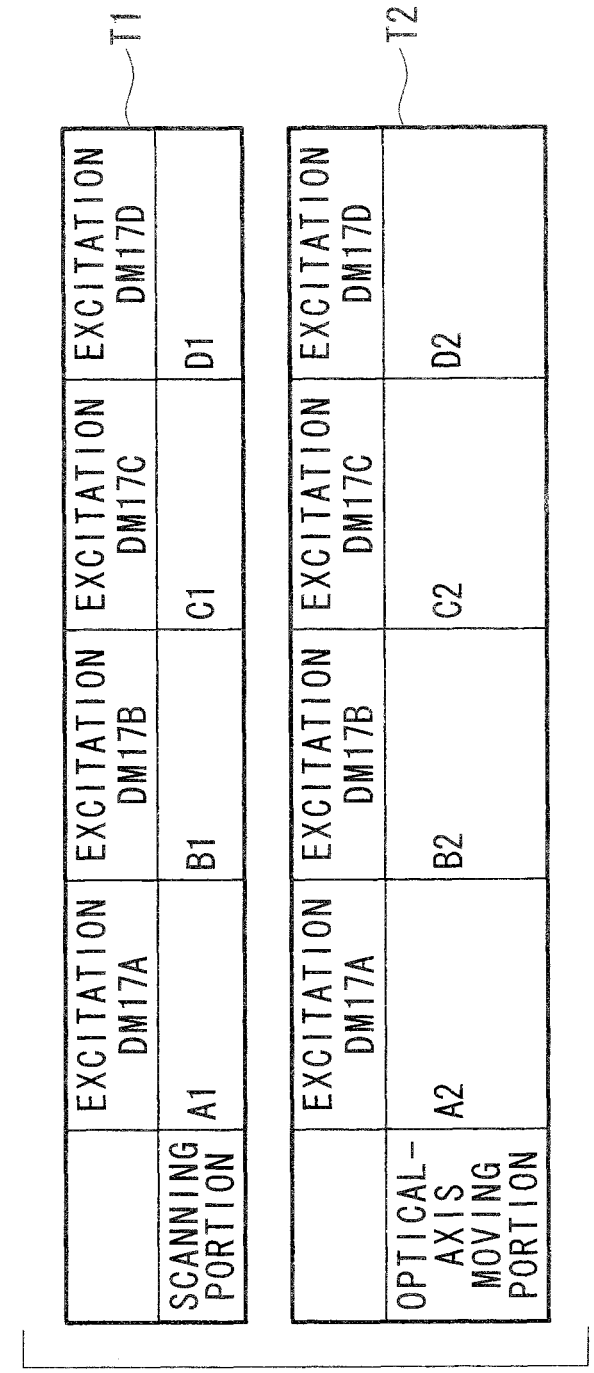
FIG. 3 is a diagram showing a table related to correction values for a scanning portion and a table related to correction values for the optical-axis moving portion.

In addition, as shown in FIG. 3, the storage portion 33 possesses a table T1 in which the individual excitation dichroic mirrors 17 (for example, an excitation DM 17A, an excitation DM 17B, an excitation DM 17C, and an excitation DM 17D) are associated with correction values (for example, a correction value A1, a correction value B1, a correction value C1, and a correction value D1) for the scanning portion 21 that correspond to the entry-angle displacement information for the laser light at the pupil position of the objective lens 29, as well as a table T2 in which the individual excitation dichroic mirrors 17 are associated with correction values (for example, a correction value A2, a correction value B2, a correction value C2, and a correction value D2) for the optical-axis moving portion 15 that correspond to the transmitting-position displacement information for the laser light at the pupil position of the objective lens 29.

The control portion 35 places one of the excitation dichroic mirrors 17 in the optical path by controlling the excitation DM turret 18 in accordance with an instruction input by the user via the user interface portion 37. In addition, the control portion 35 controls the scanning portion 21 based on the entry-angle displacement information stored in the storage portion 33 in association with the excitation dichroic mirror 17 placed in the optical path.

Specifically, each time the excitation dichroic mirrors 17 are switched by means of the excitation DM turret 18, the control portion 35 reads out a corresponding correction value from the table T1 in the storage portion 33 and changes the swivel angles of the galvanometer mirrors of the scanning portion 21 so that the entry angles of the laser light at the pupil position of the objective lens 29 are matched before and after switching the excitation dichroic mirrors 17.

In addition, the control portion 35 controls the optical-axis moving portion 15 based on the transmitting-position displacement information for the laser light stored in the storage portion 33 in association with the excitation dichroic mirror 17 placed in the optical path. Specifically, each time the excitation dichroic mirrors 17 are switched by means of the excitation DM turret 18, the control portion 35 reads out a corresponding correction value from the table T2 in the storage portion 33 and changes the rotation angle of the plane-parallel plate 16 of the optical-axis moving portion 15 so that the laser light passes through the center of the pupil position of the objective lens 29.

The operation of the thus-configured microscope apparatus 100 will now be described.

To observe a specimen with the microscope apparatus 100 according to this embodiment, for example, after introducing a predetermined fluorescent dye into the specimen, one of the excitation dichroic mirrors 17 is placed in the optical path by controlling the excitation DM turret 18 by means of the control portion 35 via the user interface portion 37, and then, laser light is emitted from the laser light source 13.

The laser light emitted from the laser light source 13 passes through the optical-axis moving portion 15, is reflected by the excitation dichroic mirror 17, and is subsequently reflected by the galvanometer mirrors of the scanning portion 21 via the reflection mirror 19. Then, the laser light reflected at the scanning portion 21 is radiated onto the specimen on the stage 11 by means of the objective lens 29 via the pupil projection lens 23, the imaging lens 25, and the reflection mirror 27. By doing so, the laser light is scanned on the specimen in accordance with the swivel angles of the galvanometer mirrors of the scanning portion 21.

When fluorescence is generated at the specimen due to the irradiation with the laser light, this fluorescence is collected by the objective lens 29 and subsequently returns along the optical path of the laser light in the reverse direction via the reflection mirror 27, the imaging lens 25, the pupil projection lens 23, the scanning portion 21, and the reflection mirror 19. Then, the optical path of the fluorescence is split from the optical path of the laser light by passing through the same excitation dichroic mirror 17, and thus, the fluorescence is detected by the detector 31. Accordingly, an image of the specimen is generated by the image generating portion based on the intensity of the fluorescence detected by the detector 31.

Then, by switching the excitation dichroic mirror 17 placed in the optical path by means of the excitation DM turret 18, the specimen can be observed by acquiring desired fluorescence images of the specimen.

Figure 4:
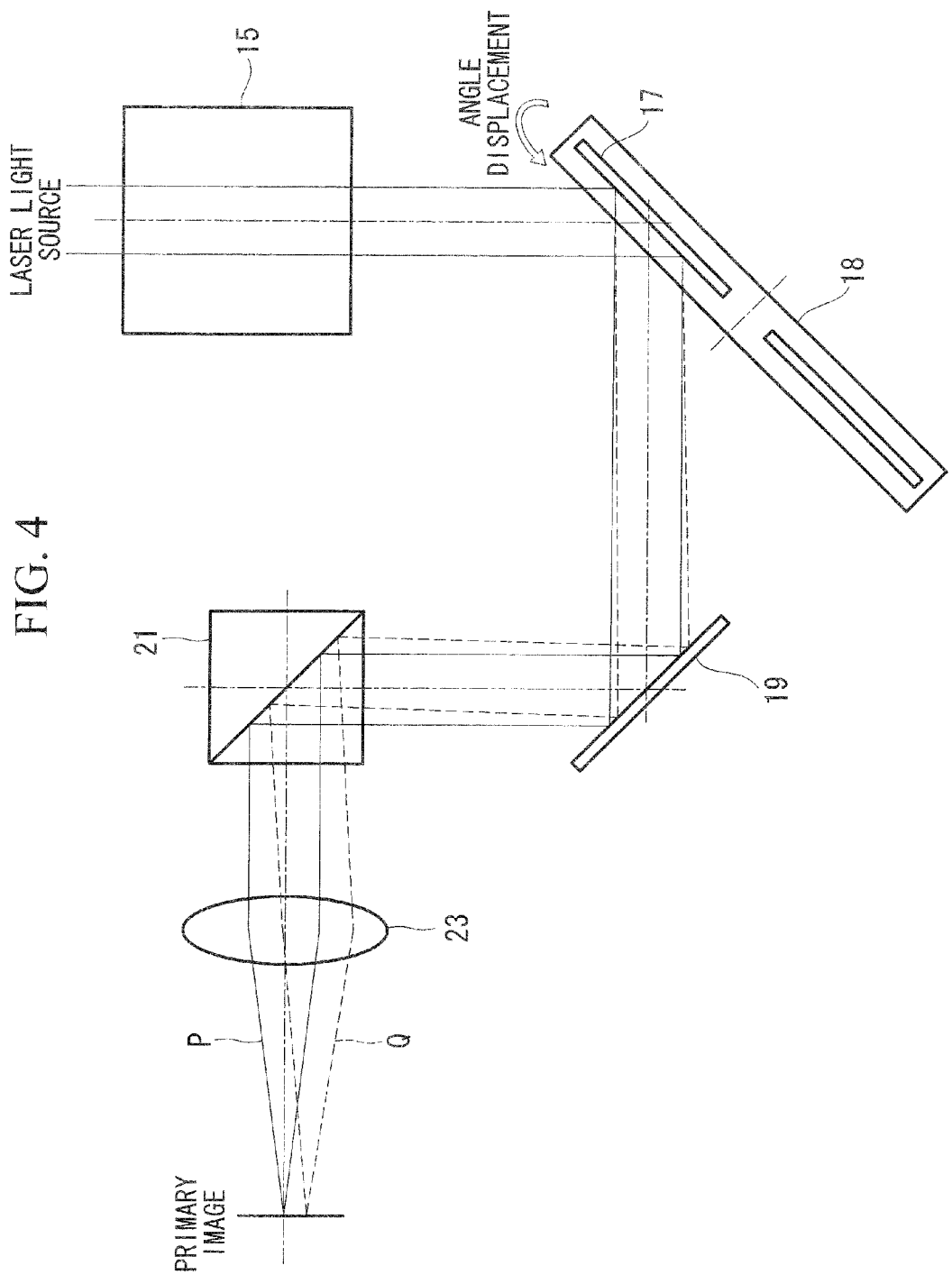
FIG. 4 is a diagram showing a displacement of the optical axis of laser light occurring due to the machining precision and mounting precision of dichroic mirrors.

The excitation dichroic mirrors 17 individually differ in terms of the machining precision and the mounting precision; for example, they individually differ in terms of thicknesses and inclinations when placed in the optical path. Because of this, when the excitation dichroic mirrors 17 are switched, reflection angles of the laser light differ due to the thicknesses and inclinations thereof, as shown in FIG. 4, causing displacement of the position at which the specimen is irradiated with the laser light, which sometimes causes a positional displacement between the acquired images of the specimen and a reduction in the brightness of the images due to displacement of the transmitting position at the pupil position of the objective lens 29. In FIG. 4, reference sign P indicates the optical path of the laser light when scanning the center of an image, and reference sign Q indicates the optical path of the laser light when a displacement has occurred in the position at which the specimen is irradiated with the laser light. These reference signs indicate the same thing in FIGS. 5, 6 and 7.

In this case, when the excitation dichroic mirror 17 placed in the optical path is switched, the control portion 35 reads out correction values corresponding to the entry-angle displacement information for the laser light at the pupil position of the objective lens 29 and the transmitting-position displacement information for the laser light at the pupil position of the objective lens 29, which are stored in the storage portion 33 in association with the excitation dichroic mirror 17 placed in the optical path, from the tables T1 and T2, respectively, and thus, the scanning portion 21 and the optical-axis moving portion 15 are controlled.

Figure 5:
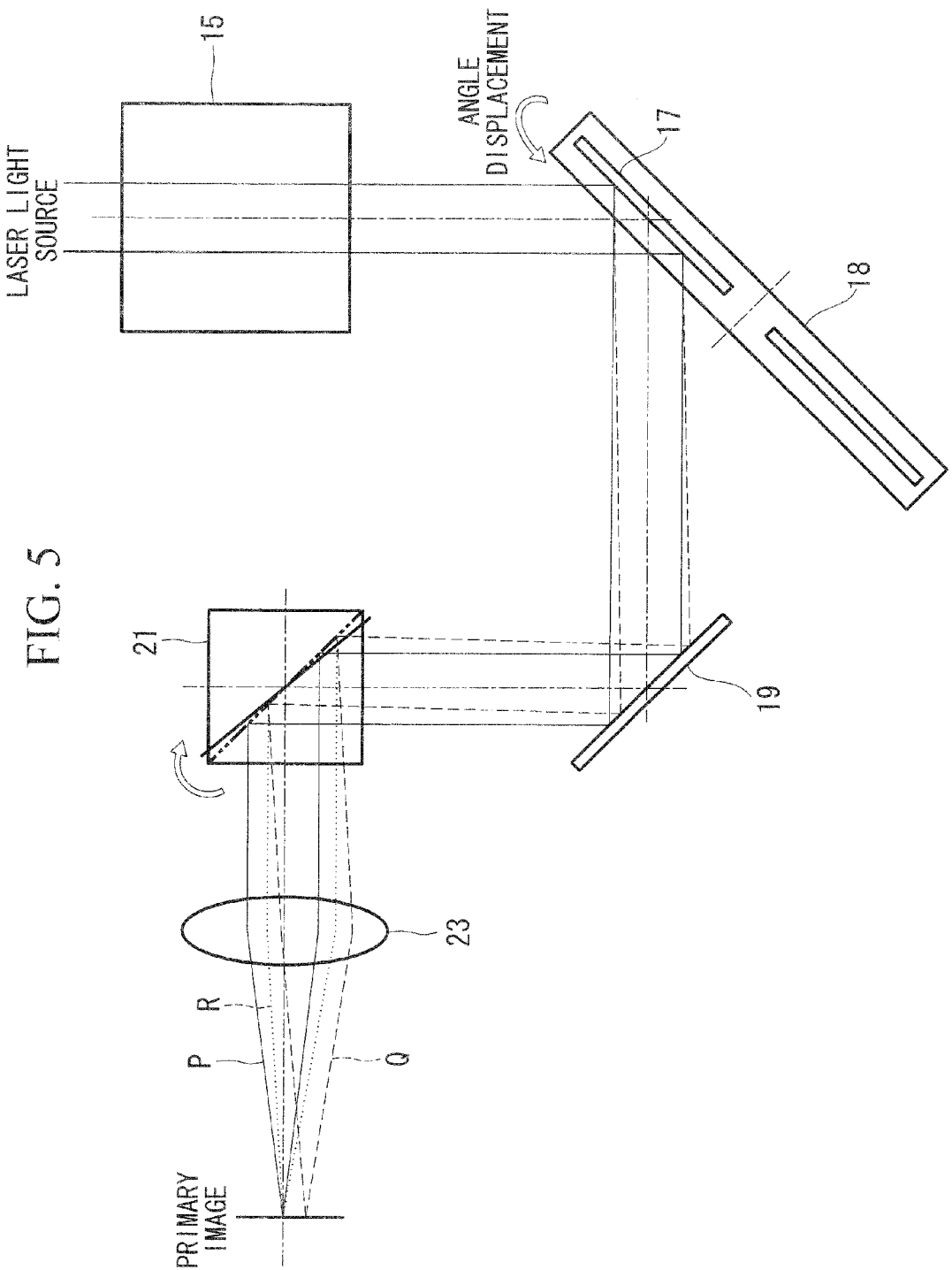
FIG. 5 is a diagram showing a state in which the displacement of the optical axis of the laser light in FIG. 4 is corrected by controlling the scanning portion.

Specifically, as shown in FIG. 5, the swivel angles of the galvanometer mirrors of the scanning portion 21 are changed by means of the control portion 35 in accordance with the correction value for the scanning portion 21 corresponding to the excitation dichroic mirror 17 placed in the optical path, and thus, the entry angles of the laser light at the pupil position of the objective lens 29 are matched before and after switching the excitation dichroic mirrors 17. By doing so, the illumination light can be radiated onto the same location in the specimen, irrespective of the machining precision and the mounting precision of the individual excitation dichroic mirrors 17, and thus, the positional displacement between the images can be corrected. In FIG. 5, reference sign R indicates the optical path of the laser light corrected by means of the scanning portion 21. This is the same in FIG. 7.

Figure 6:
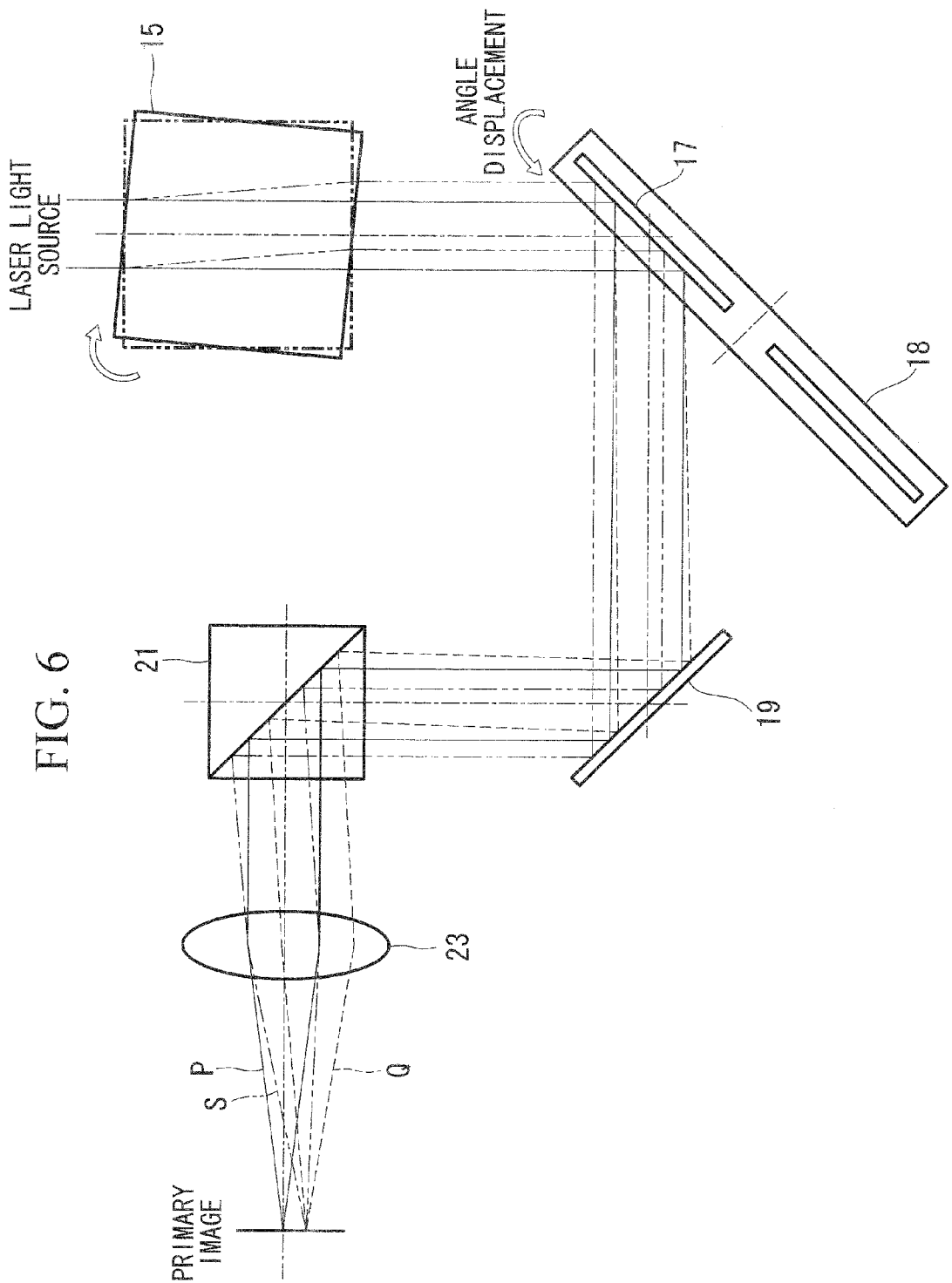
FIG. 6 is a diagram showing a state in which the displacement of the optical axis of the laser light in FIG. 4 is corrected by controlling the optical-axis moving portion.

In addition, as shown in FIG. 6, the rotation angle of the plane-parallel plate 16 of the optical-axis moving portion 15 is changed by means of the control portion 35 in accordance with the correction value for the optical-axis moving portion 15 corresponding to the excitation dichroic mirror 17, and thus, the laser light is shifted so as to pass through the center of the pupil position of the objective lens 29. By doing so, the specimen is irradiated without any loss of laser light, irrespective of the machining precision and the mounting precision of the individual excitation dichroic mirrors 17, and thus, the images can be corrected for a reduction in brightness thereof. In FIG. 6, reference sign S indicates the optical path of the laser light corrected by means of the optical-axis moving portion 15.

Figure 7:
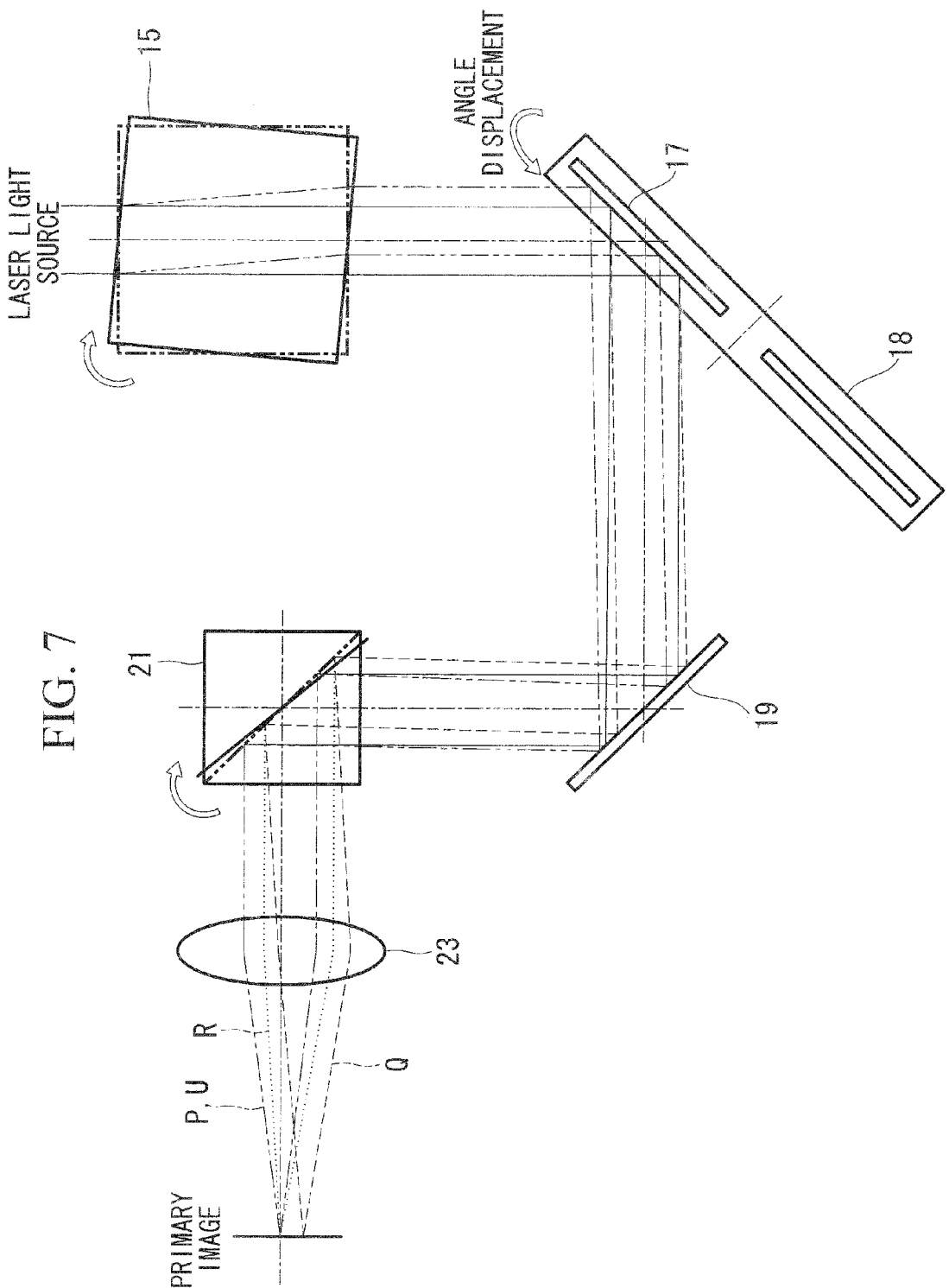
FIG. 7 is a diagram showing a state in which the displacement of the optical axis of the laser light in FIG. 4 is corrected by controlling the scanning portion and the optical-axis moving portion.

Therefore, as shown in FIG. 7, by correcting the entry angle of the laser light at the pupil position of the objective lens 29 and the transmitting position of the laser light at the pupil position of the objective lens 29 by controlling the scanning portion 21 and the optical-axis moving portion 15 by means of the control portion 35, each time the excitation dichroic mirror 17 placed in the optical path is switched, the same location in the specimen can be irradiated without any loss of laser light, irrespective of the machining precision and the mounting precision of the individual excitation dichroic mirrors 17. In FIG. 7, reference sign U indicates the optical path of the laser light corrected by means of the scanning portion 21 and the optical-axis moving portion 15.

As has been described above, with the microscope apparatus 100 according to this embodiment, the entry angle and the transmitting position of the laser light at the pupil position of the objective lens 29 are corrected each time the excitation dichroic mirror 17 placed in the optical path is switched, and thus, the specimen can be observed by using bright images without a positional displacement between the images.

Although this embodiment has been described by means of an example in which the laser light source 13 that generates laser light in a predetermined wavelength range is employed as a light source, alternatively, a plurality of laser light sources that generate laser light in mutually different wavelength ranges may be employed, and laser light may be selectively generated by one of the laser light sources.

In this embodiment, the optical-axis moving portion 15, the excitation DM turret 18, and the scanning portion 21 are controlled by a single control portion 35; however, for example, three independent control portions that separately control the optical-axis moving portion 15, the excitation DM turret 18, and the scanning portion 21 may be provided. In that case, instead of the storage portion 33, a storage portion that is connected to the control portion for controlling the scanning portion 21 and that stores the correction values for the scanning portion 21 and a storage portion that is connected to the control portion for controlling the optical-axis moving portion 15 and that stores the correction values for the optical-axis moving portion may be provided separately.

Second Embodiment

Next, a microscope apparatus according to a second embodiment of the present invention will be described.

Figure 8:
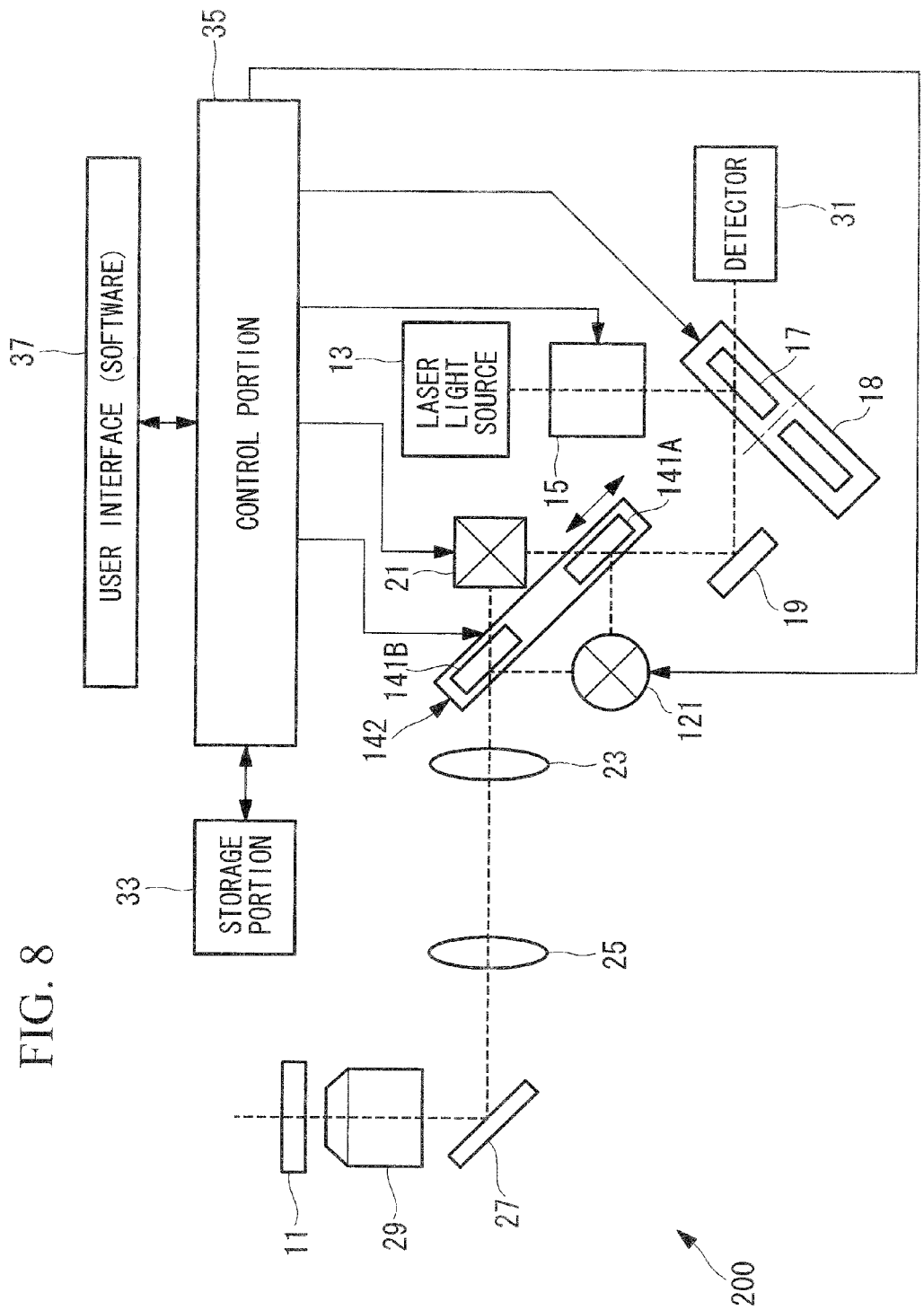
FIG. 8 is a configuration diagram showing, in outline, a microscope apparatus according to a second embodiment of the present invention.

As shown in FIG. 8, a microscope apparatus 200 according to this embodiment differs from that of the first embodiment in that a second scanning portion 121, which is separately provided from the scanning portion 21, and a switching mechanism 142 that switches between the scanning portion 21 and the second scanning portion 121 are provided.

In the following, the same reference signs are assigned to portions whose configurations are with the same as those in the microscope apparatus 100 according to the first embodiment, and descriptions thereof will be omitted.

As the second scanning portion 121, for example, a resonant scanner can be employed. The second scanning portion 121 is capable of scanning laser light at a higher speed than the scanning portion 21, which is like a controlled galvanometer scanner. In a case in which a scanning mechanism whose deflection angle cannot be freely controlled, as with a resonant scanner, is employed as the second scanning portion 121, for example, an angle correcting mechanism (not shown) or the like that rotates the entire scanner should be separately provided. By doing so, the angle of the second scanning portion 121 can be corrected.

The switching mechanism 142 is provided with a reflection mirror 141A that can be inserted into and removed from the optical path between the reflection mirror 19 and the scanning portion 21 and a reflection mirror 141B that can be inserted into and removed from an optical path between the scanning portion 121 and the pupil projection lens 23, and these two reflection mirrors 141A and 141B are designed so that they can be inserted and removed as a single unit.

As shown in FIG. 9, in addition to the table T1 related to the correction values for the scanning portion 21 and the table T2 related to the correction values for the optical-axis moving portion 15, which serve as correction data for the case in which the scanning portion 21 is used, the storage portion 33 possesses correction data for the case in which the second scanning portion 121 is used. In other words, as the correction data for the case in which the second scanning portion 121 is selected by means of the switching mechanism 142, the storage portion 33 possesses a table T3 in which the individual excitation dichroic mirrors 17 are associated with correction values (for example, a correction value A3, a correction value B3, a correction value C3, and a correction value D3) for the second scanning portion 121 corresponding to the entry-angle displacement information for the laser light at the pupil position of the objective lens 29 and a table T4 in which the individual excitation dichroic mirrors 17 are associated with correction values (for example, a correction value A4, a correction value B4, a correction value C4, and a correction value D4) for the optical-axis moving portion 15 corresponding to the transmitting-position displacement information for the laser light at the pupil position of the objective lens 29.

When the scanning portion 21 is used, the control portion 35 causes the reflection mirrors 141A and 141B of the switching mechanism 142 to be removed from the respective optical paths in accordance with an instruction input by the user via the user interface portion 37. By doing so, whereas the laser light reflected by the reflection mirror 19 enters the pupil projection lens 23 via the scanning portion 21, the fluorescence that has passed through the pupil projection lens 23 is reflected by the reflection mirror 19 via the scanning portion 21, thus returning along the optical path.

In addition, when the second scanning portion 121 is used, the control portion 35 causes the reflection mirrors 141A and 141B of the switching mechanism 142 to be inserted into the respective optical paths. By doing so, whereas the laser light reflected by the reflection mirror 19 enters the pupil projection lens 23 via the reflection mirror 141A, the second scanning portion 121, and the reflection mirror 141B, the fluorescence that has passed through the pupil projection lens 23 is reflected by the reflection mirror 19 via the reflection mirror 141B, the second scanning portion 121, and the reflection mirror 141A, thus returning along the optical path.

Then, each time the scanning portion 21 and the second scanning portion 121 are switched by means of the switching mechanism 142, the control portion 35 reads out a corresponding correction value from the table T3 in the storage portion 33 and changes the swivel angles of the galvanometer mirrors of the scanning portion 21 or the angle of the second scanning portion 121 so that the entry angles of the laser light at the pupil position of the objective lens 29 are matched. In addition, the control portion 35 reads out a corresponding correction value from the table T4 in the storage portion 33 and changes the rotation angle of the plane-parallel plate 16 of the optical-axis moving portion 15 so that the laser light passes through the center of the pupil position of the objective lens 29. Accordingly, it is possible to correct an entry-angle displacement and a transmitting-position displacement of the laser light at the pupil position of the objective lens 29 that occur when the scanning portion 21 and the second scanning portion 121 are switched by means of the switching mechanism 142.

In addition, when the second scanning portion 121 is used, each time the excitation dichroic mirrors 17 are switched by means of the excitation DM turret 18, the control portion 35 reads out corresponding correction values from the respective tables T3 and table T4 in the storage portion 33 and changes the angle of second scanning portion 121 and the rotation angle of the plane-parallel plate 16 of the optical-axis moving portion 15 so that the entry angles of the laser light at the pupil position of the objective lens 29 are matched before and after switching the excitation dichroic mirrors 17, and also so that the laser light passes through the center of the pupil position of the objective lens 29.

The operation of the thus-configured microscope apparatus 200 will now be described.

In observing a specimen by using the microscope apparatus 200 according to this embodiment, because the case in which the scanning portion 21 is used is the same as in the first embodiment, a description thereof will be omitted, and a case in which the scanning portion 21 is switched to the second scanning portion 121 and the specimen is observed by using the second scanning portion 121 will be described.

First, the reflection mirrors 141A and 141B are placed in the optical paths by means of the switching mechanism 142.

In this case, the entry-angle displacement and the transmitting-position displacement of the laser light at the pupil position of the objective lens 29 that occur when the scanning portion 21 is switched to the second scanning portion 121 by means of the switching mechanism 142 are corrected. Specifically, the control portion 35 reads out, from the table T3, a correction value corresponding to the entry-angle displacement information for the laser light at the pupil position of the objective lens 29 that is stored in the storage portion 33 in association with the excitation dichroic mirror 17 currently placed in the optical path and changes the angle of the second scanning portion 121 so that the entry angles of the laser light at the pupil position of the objective lens 29 are matched.

In addition, the control portion 35 reads out, from the table T4, a correction value corresponding to the transmitting-position displacement information for the laser light at the pupil position of the objective lens 29 that is stored in the storage portion 33 in association with the excitation dichroic mirror 17 and changes the rotation angle of the plane-parallel plate 16 of the optical-axis moving portion 15 so that the laser light reflected by the second scanning portion 121 passes through the center of the pupil position of the objective lens 29.

Next, laser light is emitted from the laser light source 13. The laser light emitted from the laser light source 13 passes through the optical-axis moving portion 15, is reflected by the excitation dichroic mirror 17, and subsequently enters the second scanning portion 121 by being reflected by the reflection mirror 141A of the switching mechanism 142 via the reflection mirror 19. Then, the laser light reflected by the second scanning portion 121 is reflected by the reflection mirror 141B of the switching mechanism 142 and is radiated onto the specimen on the stage 11 by means of the objective lens 29 via the pupil projection lens 23, the imaging lens 25, and the reflection mirror 27. Accordingly, the laser light is scanned on the specimen in accordance with the oscillation angle of the second scanning portion 121.

When fluorescence is generated at the specimen due to the irradiation with the laser light, this fluorescence is collected by the objective lens 29 and subsequently returns along the optical path of the laser light in the reverse direction via the reflection mirror 27, the imaging lens 25, the pupil projection lens 23, the reflection mirror 141B of the switching mechanism 142, the second scanning portion 121, the reflection mirror 141A of the switching mechanism 142, and the reflection mirror 19. Then, the optical path of the fluorescence is split from the optical path of the laser light by passing through the same excitation dichroic mirror 17, and thus, the fluorescence is detected by the detector 31. Accordingly, an image of the specimen is generated by the image generating portion based on the intensity of the fluorescence detected by the detector 31.

In this case, when the excitation dichroic mirror 17 placed in the optical path is switched in the state in which the second scanning portion 121 is selected, the control portion 35 reads out, from the respective tables T3 and T4, a correction value corresponding to the entry-angle displacement information for the laser light at the pupil position of the objective lens 29 and a correction value corresponding to the transmitting-position displacement information for the laser light at the pupil position of the objective lens 29, which are stored in the storage portion 33 in association with the excitation dichroic mirror 17 placed in the optical path, and thus, the second scanning portion 121 and the optical-axis moving portion 15 are controlled.

By doing so, corrections are made so that entry angles of the laser light at the pupil position of the objective lens 29, as well as the transmitting positions of the laser light at the pupil position of the objective lens 29, are matched before and after switching the excitation dichroic mirrors 17, and thus, the same location in the specimen is irradiated without any loss of laser light, irrespective of the machining precision and the mounting precision of the individual excitation dichroic mirrors 17.

As has been described above, with the microscope apparatus 200 according to this embodiment, it is not only possible to observe the specimen by using the first scanning portion 21, but it is also possible to observe the specimen by quickly acquiring images by scanning the laser light at a higher speed by using the second scanning portion 121.

In this embodiment, the optical-axis moving portion 15, the excitation DM turret 18, the switching mechanism 142, the scanning portion 21, and the second scanning portion 121 are controlled by a single control portion 35; however, for example, five independent control portions that separately control them may be provided. In that case, instead of the storage portion 33, four storage portions that are connected to the individual control portions and that individually store correction values for the optical-axis moving portion 15, the switching mechanism 142, the scanning portion 21, and the second scanning portion 121 may be provided. By doing so, it is possible to reduce time lag when driving them.

This embodiment can be modified as follows.

Figure 10:
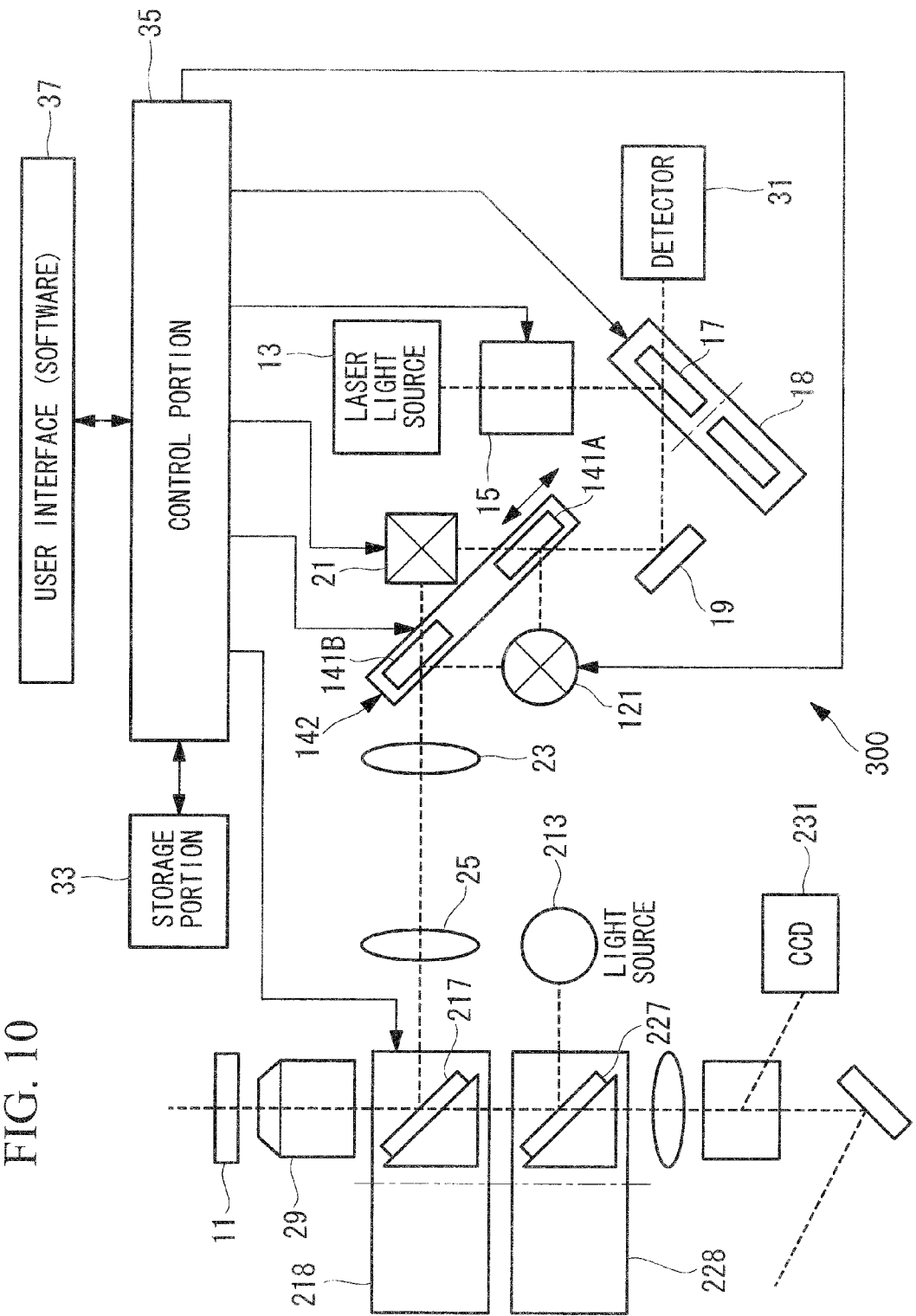
FIG. 10 is a configuration diagram showing, in outline, a modification of the microscope apparatus according to the second embodiment of the present invention.

For example, as shown in FIG. 10, instead of the reflection mirror 27, a microscope apparatus 300 according to a modification may be provided with a first cube turret (switching portion) 218 that includes a plurality of beam splitters (optical-path splitting portions) 217 that transmit or reflect laser light and fluorescence depending on the wavelength ranges thereof. In addition, the modification may be provided with an other light source 213 that emits illumination light; a CCD (two-dimensional imaging device) 231 that captures return light returning from the specimen irradiated with the illumination light and acquires an image of the specimen; and a second cube turret 228 that includes a plurality of excitation dichroic mirrors 227 that transmit or reflect the illumination light and the return light depending on the wavelength ranges thereof.

The configuration in this case should be such that, when the illumination light that is emitted from the light source 213 and reflected by the excitation dichroic mirror 227 of the second cube turret 228 passes through the beam splitter 217 of the first cube turret 218, the optical path of the illumination light and the optical path of the laser light are combined, and the illumination light is radiated onto the specimen by means of the objective lens 29. In addition, the configuration also should be such that, when the return light (for example, fluorescence or reflected light) that returns from the specimen and that is collected by the objective lens 29 passes through the beam splitter 217 of the first cube turret 218, the optical path thereof is split from the optical path of the laser light, and the light enters the CCD 231 by passing through the excitation dichroic mirror 227 of the second cube turret 228.

As correction data for the case in which the scanning portion 21 is used, as shown in FIG. 11A, instead of the table T1, the storage portion 33 may be provided with a table T5 in which the excitation dichroic mirrors 17 of the excitation DM turret 18 and the beam splitters 217 of the first cube turret 218 are associated with correction values for the scanning portion 21 (for example, a correction value AA1 for the case in which the excitation dichroic mirror 17A and a beam splitter 217A are selected, a correction value BA1 for the case in which the excitation dichroic mirror 17B and the beam splitter 217A are selected, and so on). In addition, as shown in FIG. 11B, instead of the table T2, the storage portion 33 may be provided with a table T6 in which the excitation dichroic mirrors 17 and the beam splitters 217 are associated with correction values for the optical-axis moving portion 15 (for example, a correction value AA2 for the case in which the excitation dichroic mirror 17A and the beam splitter 217A are selected, a correction value BA2 for the case in which the excitation dichroic mirror 17B and the beam splitter 217A are selected, and so on).

Furthermore, as correction data for the case in which the second scanning portion 121 is used, as shown in FIG. 11C and FIG. 11D, instead of the table T3, the storage portion 33 may be provided with a table T7 in which the excitation dichroic mirrors 17 and the beam splitters 217 are associated with correction values for the second scanning portion 121, and a table T8 instead of the table T4 in which the excitation dichroic mirrors 17 and the beam splitters 217 are associated with correction values for the optical-axis moving portion 15.

The configuration of the control portion 35 should be such that one of the beam splitters 217 is placed in the optical path by controlling the first cube turret 218 in accordance with an instruction input by the user via the user interface portion 37. In addition, the configuration of the control portion 35 should be such that, each time the excitation DM turret 18 or the first cube turret 218 is switched, the scanning portion 21 or the second scanning portion 121 is controlled based on the correction values for the scanning portion 21 in the table T5 or the correction values for the second scanning portion 121 in the table T7, which are stored in the storage portion 33, so that the entry angle of the laser light at the pupil position of the objective lens 29 is corrected. In addition, the optical-axis moving portion 15 should be controlled based on the correction values for the optical-axis moving portion 15 in the table T6 or the table T8 so that the transmitting position of the laser light at the pupil position of the objective lens 29 is corrected.

With this modification, for example, in the case in which the excitation dichroic mirrors 17 as well as the beam splitters 217 are switched, in the case in which the beam splitters 217 are switched with the excitation dichroic mirrors 17 fixed, and in the case in which the excitation dichroic mirrors 17 are switched with the beam splitters 217 fixed, the entry angle and the transmitting position of the laser light at the pupil position of the objective lens 29 should be corrected by means of the control portion 35 each time the excitation dichroic mirror 17 or the beam splitter 217 placed in the optical path is switched.

With this modification, the optical-axis moving portion 15, the excitation DM turret 18, the switching mechanism 142, the scanning portion 21, the second scanning portion 121, and the first cube turret 218 are controlled by a single control portion 35; however, six independent control portions that separately control them may be provided. In that case, instead of the storage portion 33, five storage portions that are connected to the individual control portions and that individually store correction values for the optical-axis moving portion 15, the switching mechanism 142, the scanning portion 21, the second scanning portion 121, and the first cube turret 218 may be provided. By doing so, it is possible to reduce time lag when driving them.

The embodiments of the present invention have been described above in detail with reference to the drawings; however, the specific configuration thereof is not limited to these embodiments, and design alterations or the like within a range that does not depart from the scope of the present invention are also encompassed. For example, the present invention may be applied without limitation to the individual embodiments described above, it may be applied to embodiments in which these embodiments are appropriately combined, and it is not particularly limited. For example, in the individual embodiments and modification thereof described above, the storage portion 33 is assumed to possess the tables of the correction values; however, the control portion 35 may calculate correction values each time switching is performed.

In addition, in the individual embodiments described above, an example in which the storage portion 33 is shared between the first storage portion and the second storage portion has been described; alternatively, however, the microscope apparatuses 100, 200, and 300 may be provided with a first storage portion that stores the entry-angle displacement information for the laser light at the pupil position of the objective lens 29, which is associated with the individual dichroic mirrors 17, and a second storage portion that stores the transmitting-position displacement information for the laser light at the pupil position of the objective lens 29, which is associated with the individual dichroic mirrors 17.

In addition, in the individual embodiments described above, an example in which the control portion 35 is shared between the first control portion and the second control portion has been described; alternatively, however, the microscope apparatuses 100, 200, and 300 may be provided with a first control portion that controls the scanning portion 21 based on the entry-angle displacement information for laser light at the pupil position of the objective lens 29, which is stored in the storage portion 33 in association with a dichroic mirror 17 placed in the optical path by means of the excitation DM turret 18, and a second control portion that controls the optical-axis moving portion 15 based on the transmitting-position displacement information for the laser light at the pupil position of the objective lens 29, which is stored in the storage portion 33 in association with that dichroic mirror 17.

REFERENCE SIGNS LIST

13 laser light source (light source)
15 optical-axis moving portion (shifting mechanism)
17 excitation dichroic mirror (optical-path splitting portion)
18 excitation DM turret (switching portion)
21 scanning portion
29 objective lens
31 detector (detection portion)
33 storage portion (first storage portion and second storage portion)
35 control portion (first control portion and second control portion)
100, 200, 300 microscope apparatus
121 second scanning portion (second scanning portion)
142 switching mechanism
217 beam splitter (optical-path splitting portion)
218 first cube turret (switching portion)

The invention claimed is:

1. A laser-scanning microscope apparatus that generates images by scanning laser light on a specimen and detecting light returning from the specimen, the laser-scanning microscope apparatus comprising:
   a shifting mechanism that adjusts the laser light emitted from a light source in a direction that intersects an optical axis which is parallel to an axis of the laser light emitted from the light source;
   a scanning portion with which the laser light is scanned on the specimen;
   an objective lens that radiates the laser light scanned by the scanning portion onto the specimen and that collects return light returning from the specimen due to the irradiation with the laser light;
   a detection portion that detects the return light generated by scanning the laser light on the specimen and collected by the objective lens;
   a plurality of optical-path splitting portions that are placeable in an optical path of the laser light and the return light in an insertable/removable manner and that split the optical path;
   a switching portion that switches between the plurality of optical-path splitting portions to place one of the plurality of optical-path splitting portions in the optical path;
   a first storage portion that stores entry-angle displacement information for the laser light at a pupil position of the objective lens, wherein the entry-angle displacement information is angle displacement information used when the switching portion switches between the plurality of optical-path splitting portions, and wherein the entry-angle displacement information is individually associated with each of the plurality of optical-path splitting portions;
   a first control portion that controls the scanning portion based on the entry-angle displacement information stored in the first storage portion in association with the one of the plurality of optical-path splitting portions placed in the optical path by the switching portion;
   a second storage portion that stores transmitting-position displacement information for the laser light at the pupil position of the objective lens, wherein the transmitting-position displacement information is position displacement information used when the switching portion switches between the plurality of optical-path splitting portions, and wherein the transmitting-position displacement information is individually associated with each of the plurality of optical-path splitting portions; and
   a second control portion that controls the shifting mechanism based on the transmitting-position displacement information stored in the second storage portion in association with the one of the plurality of optical-path splitting portions placed in the optical path by the switching portion.

2. A microscope apparatus according to claim 1, wherein the shifting mechanism is disposed in the optical path between the light source and the scanning portion.

3. A microscope apparatus according to claim 1, wherein each of the plurality of optical-path splitting portions splits the optical path of the laser light and an optical path of the return light.

4. A microscope apparatus according to claim 1, wherein the plurality of optical-path splitting portions split the optical path of the laser light and an optical path of the return light and split an optical path of another laser light emitted from another light source and an optical path of another return light returning from the specimen due to irradiation of the specimen with the other laser light.

5. A microscope apparatus according to claim 1, further comprising:
   a second scanning portion with which the laser light can be scanned on the specimen at a scanning speed differing from a scanning speed of the scanning portion; and
   a switching mechanism that switches between scanning of the laser light with the second scanning portion and scanning of the laser light with the scanning portion,
   wherein the first storage portion stores, in association with the scanning portion, the entry-angle displacement information for the case in which the laser light is scanned by the scanning portion, and also stores, in association with the second scanning portion, entry-angle displacement information for the case in which the laser light is scanned by the second scanning portion;
   wherein in accordance with switching performed by the switching mechanism, when the laser light is scanned by the scanning portion, the first control portion controls the scanning portion based on the entry-angle displacement information stored in association with the scanning portion, and, when the laser light is scanned by the second scanning portion, the first control portion controls the second scanning portion based on the entry-angle displacement information stored in association with the second scanning portion;
   wherein the second storage portion stores the transmitting-position displacement information for the case in which the laser light is scanned by the scanning portion, and also stores transmitting-position displacement information for the case in which the laser light is scanned by the second scanning portion; and
   wherein in accordance with the switching performed by the switching mechanism, when the laser light is scanned by the scanning portion, the second control portion controls the shifting mechanism based on the transmitting-position displacement information stored in association with the scanning portion, and, when the laser light is scanned by the second scanning portion, the second control portion controls the shifting mechanism based on the transmitting-position displacement information stored in association with the second scanning portion.

6. A laser-scanning microscope apparatus that generates images of a specimen by scanning laser light on the specimen and detecting return light from the specimen, the laser-scanning microscope apparatus comprising:
   a plane-parallel plate that is rotatable so as to adjust the laser light emitted from a light source in a direction that intersects an optical axis which is parallel to an axis of the laser light emitted from the light source;
   a scanning mirror with which the laser light is scanned on the specimen;
   an objective lens that radiates the laser light scanned by the scanning mirror onto the specimen and that collects return light returning from the specimen due to the irradiation with the laser light;
   a detector that detects the return light generated by scanning the laser light on the specimen and collected by the objective lens;
   a plurality of beam splitters that are placeable in an optical path of the laser light and the return light in an insertable/removable manner and that split the optical path;
   a switching mechanism that switches between the plurality of beam splitters to place one of the plurality of beam splitters in the optical path;

a controller that controls the plane-parallel plate, the scanning mirror, and the switching mechanism; and
a storage that is connected to the controller,
wherein the storage stores entry-angle displacement information for the laser light at a pupil position of the objective lens, wherein entry-angle displacement information is angle displacement information used when the switching mechanism switches between the plurality of beam splitters, and wherein the entry-angle displacement information is individually associated with each of the plurality of beam splitters,
wherein the storage further stores transmitting-position displacement information for the laser light at the pupil position of the objective lens, wherein the transmitting-position displacement information is position displacement information used when the switching mechanism switches between the plurality of beam splitters, and wherein the transmitting-position displacement information is individually associated with each of the plurality of beam splitters, and
wherein the controller controls the scanning mirror based on the entry-angle displacement information stored in association with the one of the plurality of beam splitters placed in the optical path by the switching mechanism, and controls the plane-parallel plate based on the transmitting-position displacement information stored in association with the one of the plurality of beam splitters placed in the optical path by the switching mechanism.

* * * * *